(No Model.)

J. S. ADAMS.
CLUTCH SHIFTER.

No. 474,203.  Patented May 3, 1892.

WITNESSES:
Percy D. Parsis
William Wilson

INVENTOR
John S Adams
by W R Stringfellow
ATTORNEY

UNITED STATES PATENT OFFICE.

JOHN S. ADAMS, OF ELGIN, ILLINOIS.

CLUTCH-SHIFTER.

SPECIFICATION forming part of Letters Patent No. 474,203, dated May 3, 1892.

Application filed October 12, 1891. Serial No. 408,537. (No model.)

*To all whom it may concern:*

Be it known that I, JOHN SPENCER ADAMS, a citizen of the United States, residing at Elgin, in the county of Kane and State of Illinois, have invented certain new and useful Improvements in Clutch-Shifters; and I do declare the following to be a full, clear, and exact description of the invention, such as will enable others skilled in the art to which it appertains to make and use the same.

My invention relates to a shifting mechanism designed for clutches of considerable capacity, or clutches in which a considerable amount of force is required in the operations of connecting and disconnecting the clutch mechanism.

The object of the invention is to provide an improved mechanism for actuating the sliding collar, sleeve, or other longitudinally-moving member through which the clutch-pulley is thrown into or out of action; and the improvement is in the direction of greater power of action, perfection of control, ease of operation, and economy of space. It is illustrated in one of its applications by the accompanying drawings, in which—

Figure 1:
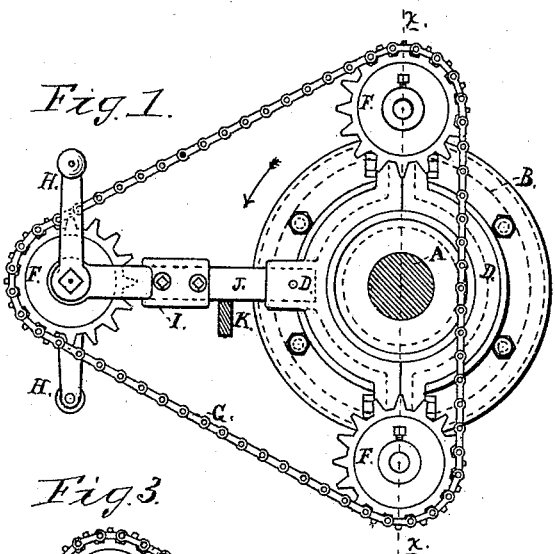
Figure 2:
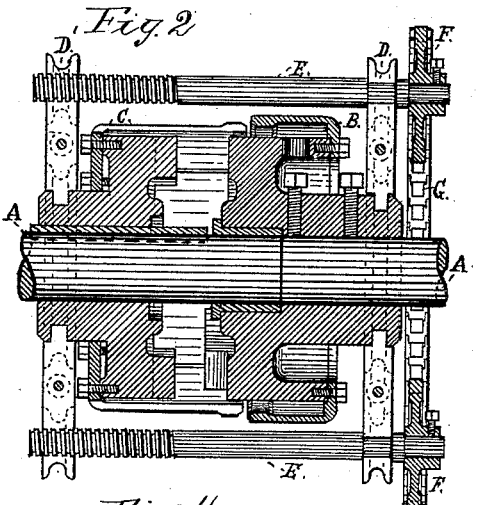
Figure 3:
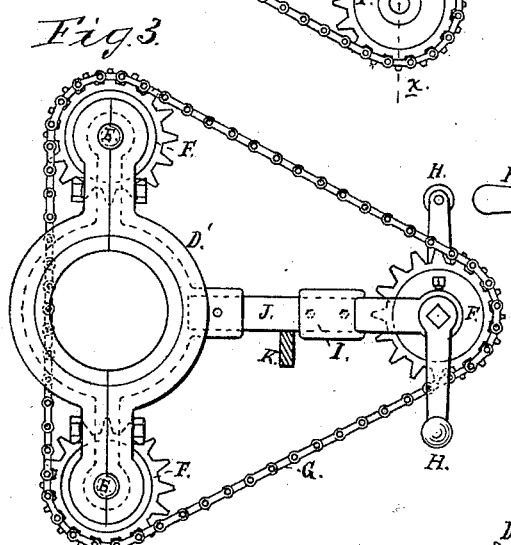
Figure 4:
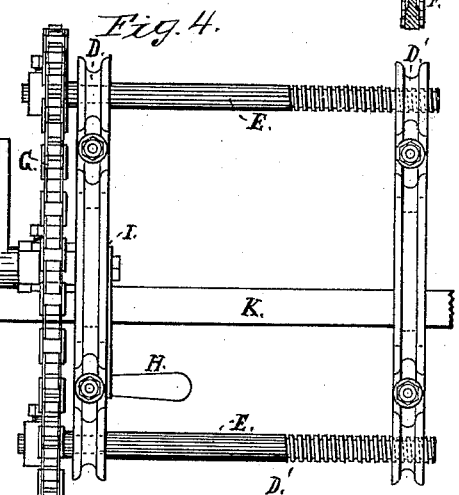
Figure 5:
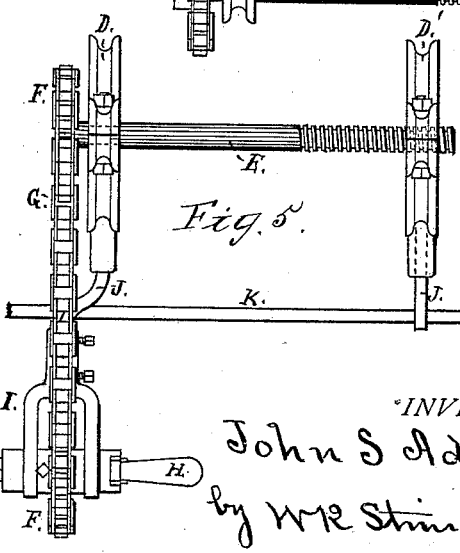

Figure 1 shows an end view of a combined friction and positive clutch-coupling with my improved clutch-shifter attached. Fig. 2 is a vertical section through line $x\ x$ of Fig. 1. Fig. 3 shows the clutch-shifter detached from the clutch-coupling, the view being from the opposite point of view, as shown in Fig. 1. Fig. 4 is a rear view, and Fig. 5 a top view, of the clutch-shifter.

Similar letters of reference indicate the same parts in the several figures.

A A show the shaft in two sections, to be connected by the use of the coupling.

B shows that portion of the clutch-coupling which is firmly fixed upon one of the shaft-sections.

C shows that portion of the coupling which may be moved longitudinally upon the shaft and feather so as to engage with or be disengaged from the part B.

D is a yoke freely fitting in an annular groove in part B, and D' is a yoke freely fitting in a similar groove in part C.

For convenience D will be termed the "fixed" yoke and D' will be termed the "movable" or the "threaded" yoke.

E E are the actuating-screws, which are journaled in yoke D and operate in threaded journals in yoke D'.

F F F are sprocket-wheels fixed upon the ends of the screws and upon the operating-shaft.

G is a chain connecting the several sprockets.

H H are cranks secured upon the ends of the operating-shaft, by which the mechanism is preferably operated.

I is a forked bracket or bearing-head for the operating-shaft.

J J are arms or bars socketed in and extending from the yokes.

K is a bar or rest so placed and secured as to prevent the shifting mechanism from rotating with the clutch.

It will be seen that by means of the chain the actuating-screws may be turned simultaneously in either direction, as desired, and that the yoke D' will thus be moved and in its movement will carry with it the movable portion C of the clutch, and thus connect or disconnect the parts B and C at the will of the operator. This mechanism is therefore an operating device without the use of the cranks, the operating-shaft, or the third sprocket-wheel; but these additional elements afford greater convenience of operating, and also afford means for varying the speed of the actuating-screws by using on the operating-shaft a sprocket-wheel larger or smaller than those on the actuating-screws.

When this shifter is to be used for operating clutch-pulleys or in any instance where it is not practicable or desirable to extend the shifter over the two parts of the clutch, as herein shown, the fixed yoke may be connected with a grooved collar fixed upon the shaft to the rear of the sliding collar; or it may be secured upon a journal-box or any fixed object which is sufficiently rigid to resist the thrust and pull of the actuating-screws. Under these conditions the sprocket ends of the actuating-screws may be journaled in any desirable form of bearing-brackets, instead of the fixed yoke D, without departing from the substance of this invention.

It will be seen that this shifter is capable of exerting great power with a comparatively small expenditure of manual strength, and will therefore be valuable in use with large friction-clutches, which require great force to throw them into or out of action.

By this mechanism it is practicable to apply the friction-pressure gradually in starting heavy machinery, and thus prevent the severe strains which are so frequently destructive when the clutch is thrown suddenly into action.

The compactness of the mechanism is an element of value where operating-space is limited.

Having described my invention, what I claim, and desire to secure by Letters Patent, is—

1. In a clutch-shifter, the combination of a fixed yoke and a series of sprocket-wheels with the movable threaded yoke, the actuating-screws, and the sprocket-chains, substantially as shown and described.

2. In a clutch-shifter, the combination, with the fixed and movable yokes, of the actuating-screws and the sprocket wheels and chains connecting the said screws with the supplementary crank-shaft, substantially as shown and described.

In testimony whereof I affix my signature in presence of two witnesses.

JOHN S. ADAMS.

Witnesses:
  GEO. W. KRAIL,
  PERCY D. PARKS.